Figure 1:
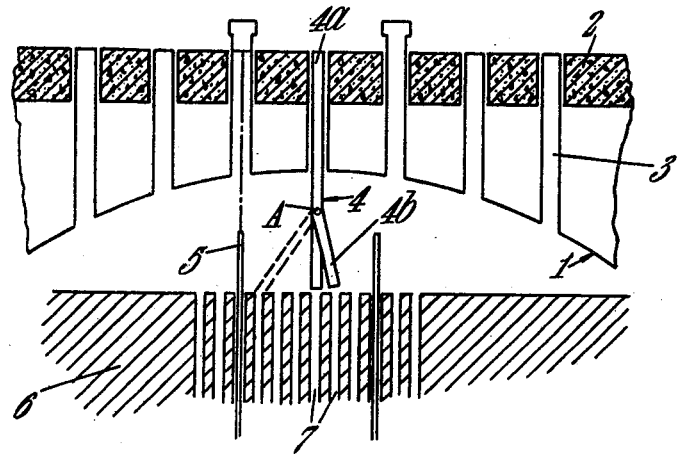

Nov. 12, 1963     A. R. KIRKPATRICK     3,110,654
NUCLEAR REACTORS
Filed Jan. 9, 1958

United States Patent Office 3,110,654
Patented Nov. 12, 1963

3,110,654
NUCLEAR REACTORS
Alan R. Kirkpatrick, Newcastle-upon-Tyne, England, assignor to C. A. Parsons & Company Limited, Newcastle-upon-Tyne, England
Filed Jan. 9, 1958, Ser. No. 707,960
Claims priority, application Great Britain Jan. 22, 1957
2 Claims. (Cl. 204—193.2)

This invention relates to nuclear reactors of the kind comprising a shell formed by a radiation shield and a vessel, said vessel housing a core of neutron moderating material in the form of graphite, said core having channels disposed therein, some of which channels house nuclear fuel in the form of natural uranium or a substantially equivalent body, whilst the remainder house means movable within the core to control the neutron flux, the nuclear fuel being inserted in and removed from the core through charging tubes located in ducts which penetrate the reactor vessel.

In such reactors it is usual to construct each charging tube in two parts, a "fixed" part that is to say a part, the axis of which is fixed in space although said part may be rotatable about its axis and a movable part the axis of which is displaceable relative to the axis of the fixed part. The fixed part of the tube passes through the aforementioned ducts in the reactor shell to the outside of the reactor structure to a charging platform from which the tubes are charged with nuclear fuel. The fixed part of each tube is axially aligned with a channel in the reactor core for nuclear fuel whilst the movable part is movable a defined distance away from the axis of the fixed part so as to be capable of being axially alligned with other channels within a defined radius for the purpose of charging these channels with nuclear fuel.

The control means usually consist of control rods which are moved within the core by means of mechanisms located in duct penetrating the reactor shell. In known constructions of the type of reactor described the control rod ducts have been used as the ducts through which the charge tubes have been introduced The manipulation of the control rods and the fuel charging tubes are all controlled from the same platform and various arrangements of duct spacing and channel pitch are possible.

In the choice of any system, however, consideration must be given to the following factors which influence a particular selection:

(1) It is desirable for operational reasons to have separate ducts for charge tubes and control rods so as to be able to operate the charge tubes independently of the control rods;

(2) A sufficiently large ratio of control rods to fuel elements should be possible so as to control the required amount of reactivity in the reactor;

(3) The pitching of the charge tube ducts and control rod ducts should be of sufficient magnitude to avoid mechanical weakening of the wall of the reactor vessel through which they pass;

(4) The arrangement and pitching of the ducts should be such as to allow for the placing of sufficient concrete and reinforcement therefor for a radiation shield, to give the latter adequate strength;

(5) The movable part of each charging tube should have a simple scanning pattern and be movable in such a way that as many fuel channels as possible are covered.

In some cases, however, it is possible to relieve the control rods of some of their control functions and use other means. In these circumstances a lower density of control rods is possible.

The object of the present invention is to provide a nuclear reactor of the kind referred to in the first paragraph of this specification having separate ducts penetrating the shell for control rods and charge tubes and which meets the above requirements in those cases where a lower density of control rods can be tolerated.

Figure 2:
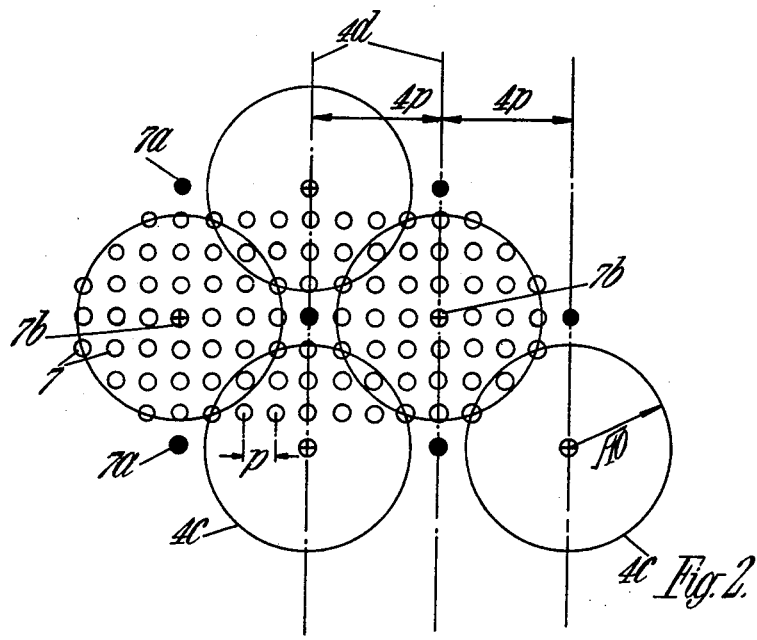

Referring to the accompanying diagrammatic drawings:
FIGURE 1 shows a section through part of a reactor structure;
FIGURE 2 shows a plan view of the surface of a core in accordance with one form of the present invention.

In carrying the invention into effect in the form illustrated by way of example and referring first to FIGURE 1, the reactor comprises a vessel 1 which is pressure tight. Surrounding the vessel 1 is a concrete radiation shield 2. Passing through the concrete shield 2 and vessel 1 are a plurality of ducts or standpipes 3 some of which house charge tubes 4 for the insertion into the reactor and removal therefrom the nuclear fuel, whilst the remainder house tubes for the passage therethrough of control rods 5. A reactor core 6 is formed of graphite and contains a plurality of channels 7 of circular cross section for the nuclear fuel and for the control rods.

Each charge tube comprises a fixed part $4a$ and a movable part $4b$. The movable part $4b$ can for example be free to move about a fixed point A so as to bring the lower end into alignment with one of the channels 7 in the core.

Referring now to FIGURE 2 the channels are disposed, in accordance with this form of the invention, in parallel equidistant rows in two mutually perpendicular directions, the channel pitch being the same in each direction. The stand pipes or ducts 3 for the charge tubes are disposed so that they are axially aligned with channels, the axes of which form the apices of isosceles triangles of base 8 × the pitch of the channels and side $4\sqrt{2}$×pitch of the channels. The movable part $4b$ of each charge tube is disposed to move in any direction over the face of the core about the axis of the fixed part of the tube and the end of the part $4b$ moves a maximum distance of $\sqrt{10}$×the pitch of the channels. Circles $4c$ show the sweep of the parts $4b$. Channels $7a$ outside the sweep are shown in black and these channels are used to house the control rods: Charge tube centres are marked $7b$.

Each movable tube $4b$ is thus capable of charging 37 channels 12 of which are shared with adjacent tubes and the ratio of control rod channels to fuel channels is 1 to 31.

The resultant standpipe arrangement has a pitch of $4p$ where $p$ is the pitch of the channels and there are parallels $4d$ of $4p$ separation which provide clear paths for the laying of reinforcement for the concrete shield.

I claim:
1. In a nuclear reactor of the kind comprising a shell formed by a radiation shield surrounding a vessel, a core of neutron moderating material with said vessel, channels disposed within said core a proportion of which are used for housing nuclear fuel in the form of natural or substantially equivalent form of uranium whilst others or the remainder house control means for varying the neutron flux within said core, ducts penetrating the said shell and in axial alignment with channels housing the control means through which ducts said control means may be inserted in or removed from the reactor and charging tubes for inserting said fuel into or removing it from the reactor said tubes comprising a fixed portion for alignment with a fuel channel and a movable portion capable of being moved in any or substantially any direction away from the axis of the fixed portion to permit loading and unloading of adjacent fuel channels; the disposition of the channels in a series of parallel equidistant rows in two mutually perpendicular directions, the pitch $p$ of the channels being the same in each direction and the provi- sion of further ducts, penetrating the shell each of which is aligned with a fuel channel and through which a charge tube may be introduced, the arrangement being that the said further ducts are in alignment with channels $8p$ apart in the direction each of the said mutually perpendicular parallel equidistant rows of channels and $4\sqrt{2} \times p$ apart in direction at 45° to said rows, the movable portion of said charge tube being capable of movement in a plane at right angles to the axes of the channels so as to be able to load and unload channels within a radius equal to $\sqrt{10} \times p$ and that the channels outside the sweep of the movable tube are used to house the means for controlling tht neutron flux.

2. A nuclear reactor as claimed in claim 1, in which the control means comprise control rods which are movable in and out of the core by motivating means operating through a series of ducts penetrating the shell and in axial alignment with said control rod channels.

References Cited in the file of this patent
UNITED STATES PATENTS 2,863,815    Moore et al. _____ Dec. 9, 1958

OTHER REFERENCES

Hinton: "International Conference on the Peaceful Uses of Atomic Engergy," vol. 3, pp. 322–329, August 1955, United Nations publication, N.Y.

Nucleonics, vol. 14, No. 12, December 1956, pp. S22–S23.